(12) United States Patent
Battlogg et al.

(10) Patent No.: US 10,393,284 B2
(45) Date of Patent: Aug. 27, 2019

(54) VALVE DEVICE AND METHOD

(71) Applicant: INVENTUS ENGINEERING GMBH, St. Anton I.M. (AT)

(72) Inventors: Stefan Battlogg, St. Anton I.M. (AT); Gernot Elsensohn, St. Anton I.M. (AT)

(73) Assignee: INVENTUS ENGINEERING GmbH, St. Anton i.M. (AT)

( * ) Notice: Subject to any disclaimer, the term of this patent is extended or adjusted under 35 U.S.C. 154(b) by 0 days.

(21) Appl. No.: 14/781,374

(22) PCT Filed: Mar. 31, 2014

(86) PCT No.: PCT/EP2014/056431
§ 371 (c)(1),
(2) Date: Sep. 30, 2015

(87) PCT Pub. No.: WO2014/161809
PCT Pub. Date: Oct. 9, 2014

(65) Prior Publication Data
US 2016/0033053 A1 Feb. 4, 2016

(30) Foreign Application Priority Data

Mar. 31, 2013 (DE) ......................... 10 2013 005 442

(51) Int. Cl.
*F16K 31/02* (2006.01)
*F16K 31/06* (2006.01)
(Continued)

(52) U.S. Cl.
CPC .......... *F16K 31/0675* (2013.01); *F16F 9/537* (2013.01); *F16K 31/0655* (2013.01); *F16K 47/023* (2013.01)

(58) Field of Classification Search
CPC .. F16F 9/537; F16K 31/0675; F16K 31/0655; F16K 47/023
See application file for complete search history.

(56) References Cited

U.S. PATENT DOCUMENTS 6,131,709 A 10/2000 Jolly et al.
8,485,324 B2 7/2013 Walthert et al.
(Continued)

FOREIGN PATENT DOCUMENTS

DE 69821799 T2 1/2005
DE 10337516 A1 3/2005
(Continued)

*Primary Examiner* — Bradley T King
(74) *Attorney, Agent, or Firm* — Laurence A. Greenberg; Werner H. Stemer; Ralph E. Locher (57) ABSTRACT

A valve device, a damper with a valve device, and a method for operating the same are described. The valve device is formed with a flow channel through which a magnetorheological medium flows. A magnetic circuit device provides a magnetic field in the flow channel. The magnetic circuit device includes a hard magnetic magnet component and at least one electrical coil that can be controlled by a control device. The magnetic circuit device has two segments, which differ in the dynamic magnetic properties thereof. Thus, by way of a magnetic pulse that can be output by the electrical coil, a specific inhomogeneity of the magnetic field in the flow channel can be set and can be stored in the hard magnetic magnet component.

25 Claims, 4 Drawing Sheets

(51) Int. Cl.
*F16F 9/53* (2006.01)
*F16K 47/02* (2006.01)

(56) References Cited

U.S. PATENT DOCUMENTS

| | | |
|---|---|---|
| 8,985,149 B2 | 3/2015 | Battlogg et al. |
| 8,985,288 B2 | 3/2015 | Battlogg et al. |
| 9,091,309 B2 | 7/2015 | Battlogg |
| 2010/0199519 A1* | 8/2010 | Battlogg ............... F16K 31/082 36/83 |
| 2012/0085613 A1 | 4/2012 | Boese et al. |
| 2012/0119123 A1* | 5/2012 | Battlogg ................... F16F 9/46 251/129.15 |
| 2012/0313020 A1* | 12/2012 | Battlogg ................ F16F 9/537 251/65 |

FOREIGN PATENT DOCUMENTS

| | | |
|---|---|---|
| DE | 102009060550 A1 | 6/2011 |
| DE | 102010055833 A1 | 3/2012 |
| WO | 9958873 A1 | 11/1999 |
| WO | 2011009586 A1 | 1/2011 |
| WO | 2011076415 A2 | 6/2011 |

* cited by examiner

VALVE DEVICE AND METHOD

BACKGROUND OF THE INVENTION

Field of the Invention

The present invention relates to a valve device, to a damper which is equipped with a valve device of this kind, and to a method for operating a valve device and, respectively, a damper.

A valve device of this kind has at least one flow channel which is provided with at least one magnetorheological medium, wherein the medium used is preferably a magnetorheological fluid (MRF). In this case, the flow of the magnetorheological fluid through the flow channel can be varied by a magnetic field which acts on the flow channel. The flow resistance through the flow channel and therefore the flow through the valve device are correspondingly influenced by the strength and the distribution of the magnetic field.

Magnetorheological fluids, such as magnetorheological liquids (MRF) for example, usually comprise a suspension of small ferromagnetic particles, such as carbonyl iron powder for example, which are distributed in a carrier liquid, such as oil or glycol for example. The particles have typical diameters of between 0.1 and 50 micrometers and, under the influence of a magnetic field, form chain-like structures along the field lines. This process is, with achievable switching times of 1 millisecond or even below, very quick and completely reversible.

An extremely wide variety of valve devices and dampers, in which the flow through the valve device is influenced by means of a magnetic field which acts on a flow channel, have been disclosed in the prior art.

For example, a controllable valve and a vibration damper which uses this valve have been disclosed in DE 698 21 799 T2. In this case, a passage which connects a first and a second chamber to one another is influenced by means of a magnetic field of a permanent magnet or an electrical coil. In order to vary the strength of the magnetic field, it is possible, for example, to change the distance between the permanent magnet and the passage.

A valve arrangement for regulating the flow behavior of a magnetorheological liquid, wherein the magnetic field which is generated by permanent magnets is dynamically superimposed by a magnetic field of a coil arrangement, has been disclosed by DE 103 37 516 A1. This design allows energy-saving operation since a main field which is modified as required by means of a magnetic field of the coil arrangement can be set by means of the permanent magnets.

An adjustable valve having a transition region has been disclosed in WO 2011/009586. In this case, a portion of the cross-sectional area of the passage channel which is subject to a field of a specific strength can be set at the valve device. As a result, the inhomogeneity of the magnetic field can be set by means of the cross-sectional area of the passage channel in this system. A configuration of this kind provides the considerable advantage that the passage channel can be divided into three regions, specifically a passage region with a small or no magnetic field, a blocking region with high magnetic field intensity, and a transition region therebetween, in which transition region the field is highly inhomogeneous. A valve of this kind allows good response behavior of a damper which is equipped with said valve.

A simple approach to a solution for influencing the damper characteristic curve in magnetorheological dampers is known from WO 99/58873 A1. Bypass bores or spring-loaded valves are used in said document. However, one disadvantage of this is that the characteristic curve cannot be changed during operation.

A flexibly adjustable valve for a magnetorheological liquid with a particularly energy-saving design is disclosed in WO 2011/076415 A2. In this case, a permanent magnet is variably magnetized by means of a magnetic pulse. After the magnetic pulse, the set magnetic field is permanently maintained by means of remanence. In order to provide a magnetic field which is inhomogeneous over the channel width, part of the channel width can be superimposed by a dynamic magnetic field of a second coil. This functions in a highly satisfactory manner but has the disadvantage that at least two electrical coils which can be driven separately have to be installed in order to generate an inhomogeneous magnetic field over the channel width. This complicates the structural design and also the assembly design and also increases the costs. In order to obtain larger adjustment ranges, WO 2011/009586 A1 also discloses structures with three coils, as a result of which the expenditure is, however, even greater since the described concepts require different current directions and current intensities in the individual coils and therefore each need a dedicated power section.

A damper device for a bicycle, in which damper device a first and a second damper chamber and are coupled to one another by means of a flow channel which is provided with a magnetorheological fluid, has been disclosed in DE 10 2009 060 550 A1. A magnetic device is associated with the flow channel in order to apply a magnetic field to the flow channel. The magnetization of a hard-magnetic material of the magnetic device is permanently changed by means of specific magnetic pulses of an electrical coil. A locally inhomogeneous magnetic field can be generated over the width of the flow channel by means of an additional magnetic field which is locally superimposed by an electrical coil. Therefore, the inhomogeneity of the magnetic field over the cross section of the flow channel can be dynamically influenced during operation. However, current is permanently required by a dynamic superimposition process. Different design variants show how a locally inhomogeneous magnetic field can be generated over the width of the flow channel by the use of two or more electrical coils in order to obtain advantageous damper characteristic curves. Disadvantages of these configurations include the complex design of the actuator and the space requirement for the additional coils which are required in order to generate the inhomogeneous magnetic field transversely to the direction of flow. In addition, a plurality of coils requires considerably more complicated, larger and primarily more expensive driving of said coils, and at least the power section for generating power has to be of multiple design.

BRIEF SUMMARY OF THE INVENTION

Against the background of the stated prior art, the object of the invention is therefore to provide a valve device, and a damper which is equipped with a valve device of this kind, and also a method for operating a valve device, wherein the characteristic curve can be adjusted with a low level of expenditure even during ongoing operation.

This object is achieved by a valve device having the features as claimed, by a damper having the features as claimed, and by a method for operating a valve device having the features as claimed. Preferred developments are the subject matter of the dependent claims. Further advantages and features of the present invention can be found in the general description and the description of the exemplary embodiments.

A valve device according to the invention comprises at least one flow channel which is provided with a magnetorheological medium, and in particular a magnetorheological fluid, and preferably through which a magnetorheological medium, and in particular a magnetorheological fluid, flows. At least one control device is provided. A magnetic circuit device serves to provide a magnetic field in the flow channel. The magnetic circuit device comprises at least one hard-magnetic magnet component and at least one electrical coil which can be driven by the control device. The magnetic circuit device has at least two sections which differ in terms of their dynamic magnetic properties. As a result, a specific inhomogeneity of the magnetic field can be set in particular in the flow channel by a magnetic pulse, which can be output by the electrical coil, and can be stored in the hard-magnetic magnet component. It should be possible to generate the inhomogeneity substantially obliquely in relation to the direction of flow of the magnetorheological medium in the flow channel. The at least two sections are, in particular, in the form of ferromagnetic sections or ferromagnetic components. In particular, the inhomogeneity can be generated substantially transversely or even perpendicularly in relation to the direction of flow of the magnetorheological medium in the flow channel.

The valve device according to the invention has many advantages. The present invention is distinguished by its simple design and, in particular, the driving which is very easy to implement, this being advantageous primarily for applications in cost-sensitive areas. A considerable advantage of the valve device according to the invention is that a specifically inhomogeneous magnetic field can be permanently generated by means of one or a plurality of magnetic pulses of the electrical coil. Owing to the different dynamic properties of the at least two sections, the length, the profile and the strength of different pulse profiles of magnetic pulses have different effects on the respective sections of the hard-magnetic magnet component. Whereas the dynamic properties do not play a large role or even no longer play any role at all in the case of long magnetic pulses culminating in static magnetic fields, the influence of the different dynamic magnetic properties increases in the case of short or particularly short magnetic pulses, so that different magnetic conditions also permanently prevail in the at least two sections when different pulse shapes are output.

The valve device ensures advantageous damper characteristic curves by way of an inhomogeneous field profile obliquely or transversely in relation to the direction of flow. In particular, a specific and permanently inhomogeneous magnetization is possible owing to electrical pulses, as a result of which a reduction in the energy requirement and in the expenditure for driving in comparison to the prior art is possible. A more simple design of the actuator and primarily highly simplified driving can be achieved.

Depending on the design of the sections, it is possible to use a precisely defined (particularly) short magnetic pulse of the coil to permanently reverse the magnetization of the hard-magnetic material which is associated with a section, while the magnetization of the hard-magnetic material which is associated with another section is not changed. In this case, the two sections are, in particular, parts of the same magnetic circuit and preferably differ only in terms of the dynamic magnetic properties. The strength of the magnetization or of the reversal in magnetization can be varied over the maximum possible range.

Short pulses within the meaning of this application are pulses which last for less than 10 seconds, preferably less than 1 second, and particularly preferably less than 100 milliseconds. Particularly short pulses are pulses with a duration of less than 10 milliseconds or preferably less than 1 millisecond.

In the valve device according to the invention, a magnetic pulse of the electrical coil, which magnetic pulse can be controlled by the control device, can specifically set an inhomogeneity in the magnetic field profile of the magnetic field of the magnetic circuit device in the flow channel.

The flow channel preferably has, transversely in relation to a direction of flow of the magnetorheological medium, a flow cross section with a channel width. The sections are particularly preferably provided in an offset manner in the direction of a channel width. The sections can also be provided next to one another or also so as to overlap. As a result, a specifically inhomogeneous magnetic field can be generated in the direction of the channel width.

In a preferred refinement, a valve device preferably comprises at least one flow channel which is provided with a magnetorheological medium, wherein the flow channel has, transversely in relation to a direction of flow of the magnetorheological medium, a flow cross section with at least one channel width. A control device is associated with the valve device, and the valve device comprises a magnetic circuit device. The magnetic circuit device has at least one hard-magnetic magnet component and at least one electrical coil which can be driven by the control device. The electrical coil is designed to permanently change the magnetization of the hard-magnetic magnet component by means of at least one magnetic pulse, in order to set the magnetic field which acts in the flow channel. The magnetic circuit device has at least two sections along the channel width, said sections differing in terms of their dynamic magnetic properties. As a result, an inhomogeneity of a profile of the magnetic field can be set in the flow channel along the channel width by means of a magnetic pulse of the electrical coil, which magnetic pulse is controlled by the control device, and can be stored in the magnetic circuit device and, in particular, the hard-magnetic magnet component.

The locally acting magnetic field strength along the channel width can be set in a specifically inhomogeneous manner over the flow cross section transversely in relation to the direction of flow of the magnetorheological medium, so that a ratio of maximum magnetic field strength to minimum magnetic field strength is greater than 2, and in particular greater than 5, greater than 10, greater than 100 or greater than 1000. This is caused, in particular, by means of specifically controlled magnetic pulses of the electrical coil.

The magnetic field can have, transversely in relation to the direction of flow over the width of the flow channel, a transition region with a steep gradient. However, the magnetic field can also be uniform in individual regions or over the entire channel cross section. This means that, given suitable magnetic pulses, a less inhomogeneous or even a homogeneous field can also be generated. It is possible to permanently influence the extent of a magnetic field which acts in the flow channel and the shape of said magnetic field by virtue of the shape, duration and intensity of a magnetic pulse.

As a result, the inhomogeneity of the magnetic field over the channel width and/or the flow cross section of the flow channel can be specifically set.

By way of the electrical coil, different magnetic field profiles over the channel width can be generated by means of different magnetic pulse profiles over time, so that corresponding field strength profiles are produced over the channel width depending on the time profile of the magnetic pulses.

By virtue of only a single magnetic pulse of a single electrical coil, a specifically inhomogeneous magnetic field can be generated in the flow channel and stored in the hard-magnetic component. Different magnetic field regions can be generated over the flow cross section. It is possible, for example, for a passage region which has virtually no magnetic field to be provided in the flow channel, and for a blocking region, in which a homogeneous magnetic field of a specific strength is generated, to be generated, and for a transition region, in which there is a highly inhomogeneous magnetic field and in which the magnetic field strength which is active there changes to a very great extent, to be provided between the passage region and the blocking region.

The sections are preferably at least partially composed of materials with different electrical or magnetic properties. In particular, the sections are composed of at least one ferromagnetic material.

In all of the refinements, the dynamic magnetic properties of a section preferably depend on the shape of the section. In a preferred development, at least one part of the magnetic circuit device is solid and composed of ferromagnetic material or comprises a solid ferromagnetic body. The solid part can, in particular, be of homogeneous design.

At least one section of the magnetic circuit device is preferably composed of at least one layer material, and in particular ferromagnetic layer material, and in particular a laminate. Sheet metal with defined electrical and magnetic properties is preferably used for this purpose, said sheet metal being used, for example, for constructing transformers or electric motors. As a result, this section of the magnetic circuit device has anisotropic properties. This means that the section contains direction-dependent properties. For example, thin layers which are not or only poorly electrically conductive can be provided between individual magnetic layers, so that the section of the magnetic circuit device perpendicular in relation to the layers of the layer material has only a low level of electrical conductivity or no electrical conductivity at all. Eddy currents due to changing magnetic fields in the section can be reduced by measures of this kind. Therefore, a different dynamic magnetic property can be achieved with a ferromagnetic section which is composed of a layer material (for example laminate) than with a ferromagnetic section with a homogeneous and solid body, even if the two parts are composed of the same material or a material with comparable electromagnetic properties.

Eddy currents are produced in an electrically conductive and solid body given changing magnetic fields, such as due to the action of a magnetic pulse for example, said eddy currents in turn generating dynamic magnetic fields which generally oppose the active magnetic pulse. As a result, a solid ferromagnetic magnet component opposes a dynamically active magnetic field more than a corresponding component which is composed of a layer material, even if the materials used in the solid component and in the component which is composed of a layer material are the same.

The two or more separate sections can be provided on separate components. The sections can be composed of different magnetizable materials. It is also possible for the same magnetizable materials to be used, wherein the different dynamic magnetic properties of the sections are caused, for example, by different material, different shaping, different processing or post-treatment. Shaping is understood to mean, in particular, the specific use of a laminated layer material or solid material. At least two sections are preferably in the form of ferromagnetic sections. The sections can be in the form of separate ferromagnetic components.

A dynamic magnetic property is understood to mean the time dependence of magnetic properties, in particular the reaction of the material to changing magnetic fields. The time gradient of the magnetic field is of critical importance to the dynamic magnetic property, wherein locally inhomogeneous magnetic fields and therefore also spatial magnetic field gradients can be produced by a dynamic magnetic field.

The way in which a ferromagnetic material behaves in a changing magnetic field depends mainly on the magnetic and electrical properties of the material. The material can follow a magnetic pulse with a defined rate of change and up to a specific level depending on conductance, permeability, coercive field strength or other electromagnetic properties. The shape is likewise of critical importance since the effect of the eddy currents which are induced in the material itself can be influenced by said shape.

The hard-magnetic magnet component is composed of at least one hard-magnetic material. Within the meaning of this application, hard-magnetic means a material with a coercive field strength of over 1000 A/m (amperes per meter), and in particular over 10 kA/m. A material of this kind can be magnetized by an externally generated magnetic field, such as a magnetic pulse of the coil for example, and this magnetization can also be permanently maintained after the external field is switched off. The region with hard-magnetic properties can be called a magnet, wherein this term can also be understood to mean a permanent magnet within the meaning of this application.

In all cases, the provision of 3, 4, 5 or more sections which differ at least in terms of their dynamic magnetic properties is also preferred. A continuous or virtually continuous transition of the dynamic magnetic properties over a predetermined and/or adjustable distance is also possible.

In addition to these sections which can specifically generate an inhomogeneous magnetic field along a channel width owing to different dynamic magnetic properties, the magnetic circuit can comprise further parts or sections. These parts or sections are preferably composed of ferromagnetic material and are, in particular, designed such that they are not substantially slower in respect of their magnetic dynamics than the fastest material in the sections for generating the inhomogeneous field.

In all refinements, it is preferred that at least one conductor loop is associated with at least one section of the magnetic circuit device. In this case, the conductor loop can be associated not only with one section, but also associated entirely or else only partially with a plurality of sections.

The conductor loop preferably has at least one turn which is, in particular, electrically short-circuited. It is also possible for the conductor loop to be only substantially short-circuited.

The conductor loop comprises an electrical conductor which extends fully or at least partially around a section or else only part of a section. As a result, an electric current is induced in the conductor loop when a dynamic magnetic field acts on the section, said electric current in turn generating a magnetic field which is directed against the magnetic field of the electrical coil or the generating magnetic field. The opposing magnetic field of the conductor loop therefore delays a change in the magnetic field in the associated section, as a result of which a field change can be delayed in this section in relation to other sections. Therefore, a specifically inhomogeneous magnetic field can be set—depending on the length of the electrical pulse. A fully homogeneous magnetic field can be set over the cross section of the flow channel given (very) long pulses. A specific and very inhomogeneous magnetic field can be set by shorter or very short pulses.

Depending on the structural design, it is possible for the magnetic field which is dynamically generated by the conductor loop to act in the same direction or in the opposite direction to the magnetic field of the electrical coil. An orientation in the same direction is possible, for example, by a structural design in which, for example, at least two conductor loops are electrically connected and in which the field which is generated by a conductor loop strengthens, weakens or deforms the field which is generated by the coil in this section. Strengthening of the magnetic pulse or weakening of the magnetic pulse can be achieved in this way. A change in the dynamic magnetic property of this section is achieved by the conductor loop in any case. The dynamic properties of the, in particular, ferromagnetic section are different owing to a conductor loop. In particularly simple cases, the conductor loop is designed as a ring. This is virtually a single turn which is short-circuited, that is to say which has no ends or of which the ends are connected to one another. However, it is also possible for the conductor loop to comprise several turns which extend around at least one part of the section of the magnetic circuit device. The effectiveness of the conductor loop can be increased in this way.

It is also possible and preferred for at least two conductor loops to be electrically connected to one another directly or by means of components such as, for example, capacitors or diodes or coils and possibly also resistors.

In all refinements, it is preferred for the control device to be designed and suitable for outputting pulses of different length and/or intensity. In particular, the control device is set up and designed to output pulses with different pulse shapes. It is possible to generate any desired sequence of pulses. It is possible, for example, for the control device to output magnetic pulses of adjustable length and/or intensity by means of the electrical coil. Electrical pulses with a duration of between 10 microseconds and 10 seconds are possible and preferred. In principle, the electrical pulses can be of any desired length. Electrical pulses which are converted into magnetic pulses by the electrical coil are preferably output by the control device, wherein the length of the electrical pulses is preferably greater than 10 microseconds. Electrical pulses with pulse durations of between approximately 50 microseconds and 50 milliseconds are particularly preferred. The exact length of the electrical pulses depends on the respective design. In preferred applications, electrical pulses of between 0.05 and 5 milliseconds are sufficient.

In all refinements, it is possible for at least one bypass and/or at least one passage region to be provided. A bypass can be provided as a separate bypass channel but, in the form of a passage region, is preferably part of the flow channel and therefore can likewise be at least partially set. It is also possible for a bypass to be provided at the flow channel, said bypass, for reasons of construction, not being subject to a magnetic field or to an only extremely small magnetic field, for example by the flow channel being designed to be wider than that region of the magnetic circuit device which adjoins said flow channel.

In all refinements, it is preferred for the flow channel to have an adjustable transition region. A highly inhomogeneous magnetic field is present in the adjustable transition region. Particularly with 3, 4 or more different sections which preferably adjoin the flow channel or are arranged in the vicinity of said flow channel, virtually any desired inhomogeneity of the magnetic field can be provided over the flow cross section.

For simple and expedient implementations, the design of the magnetic circuit device can be selected such that the setting range which is provided for construction-related reasons corresponds precisely to the application and the inhomogeneous field profile can be changed only within specific limits. An adjustment range which is restricted for construction-related reasons permits particularly expedient and compact valves, simpler driving and, depending on the application, advantages such as fail-safe functions.

In simple cases, the flow cross section can be rectangular or approximately rectangular. However, circular, annular, segmented ring-like or oval or rounded or other cross sections are also possible. The strength of the magnetic field in the respective section and also the effect of the field on the flow resistance in this section can be influenced by the shape. In any case, a channel width and at least one channel height perpendicular in relation to the direction of flow of the magnetorheological fluid can be associated with the flow cross section. The majority of the magnetic field lines and, in particular, at least virtually all magnetic field lines or all magnetic field lines pass transversely through the flow cross section. The magnetic field lines can be oriented perpendicularly in relation to the channel width in sections or altogether. However, magnetic field lines which are oriented to the channel width at an angle obliquely with respect to the vertical are also possible. The flow channel can be bent. In this case, the local magnetic field lines are preferably transverse in relation to the local wall.

In preferred developments, two or more electrical coils can also be provided. While it is already possible to provide a specifically inhomogeneous magnetic field in the flow channel with a single electrical coil, it is possible, for example, for the size of the setting range to be further increased by means of a second electrical coil, or for a further electrical coil which is designed, for example, only for low magnetic field strengths and which is used for dynamically modeling the prevailing magnetic field to also be provided in addition to an electrical coil for generating magnetic pulses.

A magnetic field which is superimposed on the magnetic field which is generated by the hard-magnetic material can be generated by at least one coil, but without permanently changing the magnetization of said magnetic field which is generated by the hard-magnetic material. As a result, it is possible, for example, for small changes in the flow characteristics to take place very quickly and efficiently, without giving up the advantages of permanent magnetization for this purpose.

A preferred application of the valve is in a damper. A damper according to the invention comprises at least one valve device as has been described above. In this case, a damper according to the invention comprises, in particular, two bodies or housing parts which can be moved relative to one another and at least two damper chambers between which at least one valve device is provided. The damper serves to damp the relative movement of one body in relation to another. Use in other regions, such as energy absorbers or overload valves or the like for example, is also possible. The valve device of the damper comprises at least one flow channel through which a magnetorheological medium flows. A control device serves for control purposes. At least one magnetic circuit device is provided in order to provide a magnetic field in the flow channel. The magnetic circuit device comprises at least one hard-magnetic magnet component and at least one electrical coil which can be driven by the control device. The magnetic circuit device has at least two sections which differ in terms of their dynamic magnetic properties. An inhomogeneity of the magnetic field can be set in the flow channel by a or the magnetic pulse which can be specifically output by the electrical coil, and can be stored in the hard-magnetic magnet component.

In this case, the valve device comprises, in particular, at least one flow channel which is provided with a magnetorheological medium and which preferably has, transversely in relation to a direction of flow of the magnetorheological fluid, a flow cross section with a channel width. Therefore, a specific inhomogeneity of the magnetic profile of the magnetic field can be set along the channel width in the flow channel by means of a controlled magnetic pulse of the electrical coil. The throughflow resistance and therefore the damping can be set in this way.

The damper according to the invention is very advantageous since it allows flexible use together with a simple and cost-effective design. It is possible to provide an, in particular, adjustably highly inhomogeneous magnetic field and therefore a transition region in the flow channel, this leading to a good response behavior of the damper in the event of small shocks or impacts.

The method according to the invention serves, in particular, for operating a valve device. A valve device of this kind which is suitable for carrying out the method has, in particular, at least one flow channel through which a magnetorheological medium flows, and further comprises a magnetic circuit device having at least one hard-magnetic magnet component and having at least one electrical coil. The magnetic circuit device of a suitable valve device has at least two sections which differ in terms of their dynamic magnetic properties. The method is carried out using a control device, wherein at least one controlled magnetic pulse is output by the electrical coil. The inhomogeneity of the magnetic field, which inhomogeneity is generated by the magnetic pulse, is permanently stored in the hard-magnetic magnet component. The generated inhomogeneity of the magnetic field extends obliquely, preferably transversely or even perpendicularly, in relation to the direction of flow of the medium in the channel.

The method according to the invention likewise has many advantages. The method is simple to carry out and can be applied to actuators which can be constructed in a simple manner. The magnetic field of the magnetic circuit device in the flow channel is permanently set by controlling the electrical pulses of the electrical coil.

In this case, the flow channel of the valve device has, in particular, a flow cross section and, transversely in relation to a direction of flow of the magnetorheological medium, a channel width. Therefore, the inhomogeneity of the magnetic field is set along the channel width.

In this case, a more inhomogeneous magnetic field can, in particular, be generated in the flow channel by a short pulse than by a long pulse. The dynamic properties have a stronger action in the case of a short pulse than in the case of a long pulse. As a result, the different dynamic properties of the ferromagnetic sections can be better utilized in the case of a relatively short pulse. A pulse is short when the pulse duration is not sufficient to generate a uniform homogeneous magnetic field in the various sections of the magnetic circuit device. In particular, the magnetic field can be very different in different sections of the magnetic circuit device during the duration of a short pulse, but equalize again in succession given relatively long pulses culminating in a static magnetic field.

An at least substantially homogeneous and preferably homogeneous magnetic field is preferably generated in the flow channel by a long magnetic pulse or a static magnetic field.

In all cases, it is possible, in order to model the characteristic curve, for a dynamic magnetic field to be generated by the electrical coil and to be superimposed on the static magnetic field of the magnetic circuit device. The magnetic field of the hard-magnetic magnet component can be influenced by means of the associated electrical coil and, in particular, continuously varied and/or permanently changed by means of short pulses of the electrical coil.

It is preferred for the magnetic field of the electrical coil to be dynamically influenced by a magnetic field of at least one conductor loop at least in sections during a magnetic pulse. In this case, this conductor loop should not be actively driven, but rather draw the energy from the field change by induction. The sum of the magnetic field of the generating coil and of the field of the conductor loop, which field is produced by induction currents, acts on the section which is situated within said conductor loop. The dynamic magnetic effects in this section therefore have at least partially external causes since the magnetic field itself is influenced.

The magnetization of hard-magnetic material is preferably specifically locally differently changed in terms of shape and intensity depending on the pulse height, duration and pulse shape of at least one magnetic pulse, and in particular stored.

In all cases, the present invention provides the advantages of a simple valve design with remanence and an adjustable transition region with a simple design and simple driving. The magnetic field of the magnetic circuit device, which magnetic field can be changed in terms of shape and intensity, is generated by pulses, in particular, of a single electrical coil and permanently stored in the hard-magnetic material of the hard-magnetic magnet component. As a result, the drive system of an actuator is considerably simplified and additionally more cost-effective, smaller and more robust.

It is possible to set a specifically inhomogeneous magnetic field in a controlled manner by the specific use of particular materials in the magnetic circuit device and by the design of said magnetic circuit device and by the use of possibly additional elements which change the magnetic field in terms of shape and intensity. By virtue of, for example, using layer materials and solid ferromagnetic materials and also by using conductor loops in the form of, for example, short-circuit rings, the induction of eddy currents can be used in order to generate a locally inhomogeneous magnetic field and preferably to store said locally inhomogeneous magnetic field in the form of a permanent magnetization of the hard-magnetic material.

The invention makes specific use of the following effects which are usually considered to be disruptive in the prior art and are therefore suppressed if possible.

The invention allows a magnetic field which can be varied in terms of shape and intensity and can be specifically controlled to be generated by at least one electromagnetic pulse of an electrical coil in a flow channel of a valve device. As a result, a transition region is obtained, said transition region being characterized by at least one field gradient which runs, in particular, transversely in relation to the direction of flow. In this case, the field lines can run at least partially or entirely obliquely and/or even at least partially or entirely perpendicularly in relation to the flow channel. Owing to the use of hard-magnetic materials, this gradient is maintained without further energy being supplied.

The valve device permanently maintains the field strength and the field strength profile as long as it is not influenced by external circumstances, such as correspondingly high other magnetic fields or high temperatures. Therefore, the magnetic field collapses sharply, for example, when the Curie temperature of the magnet is reached.

The magnetic field in the flow channel can be completely or at least partially canceled by specific driving. The magnetization of the hard-magnetic material can be strengthened, weakened, canceled or have its polarity reversed by magnetic pulses of the coil. By utilizing dynamic magnetic effects in the magnetic circuit, various sections of the hard-magnetic material can be differently magnetized and therefore permanently generate an inhomogeneous magnetic field.

Within the meaning of this application, permanent means a time period which is several times longer than the duration of the electrical or magnetic pulse. In particular, time periods of at least several seconds, minutes, hours, days or longer are meant by said term.

In all refinements and developments of the invention, the permanent magnetization of the hard-magnetic magnet component can be set to any desired value between zero and the remanence of the respective magnet material by at least one magnetic pulse of the electrical coil. The polarity of the magnetization can also be changed.

In the valve device, it is possible to provide a blocking region, which is situated entirely in the magnetic field, and a passage region, which is situated outside the magnetic field, and also a transition region, which is situated between the passage region and the blocking region, in the flow channel.

In principle, the individual regions are not separated by mechanical boundaries, but instead the separation corresponds to virtual subdivision on the basis of the prevailing field strength. However, it is also possible to divide the flow channel into various partial channels by mechanical boundaries. In this case, the individual magnetic regions (blocking region etc.) can each extend over one or more of these partial channels.

In all refinements, it is preferred for an adjustable region of the valve characteristic curve to be prespecified by the design of the magnetic circuit device and of the flow channel. The magnetic field and, in particular, the inhomogeneity of said magnetic field can be set by magnetic pulses.

Using the valve device according to the invention, it is possible to provide a pressure/speed graph in which the magnetorheological fluid flows only in the "open" passage region at very low speeds. As the flow rate increases, the pressure difference in the valve device increases until the corresponding shear stress of adjoining MRF chains is reached in the transition region and said MRF chains are carried away. As the flow rate increases, the passage region consequently increases in size at the expense of the transition region. The passage region or bypass is not mechanically delimited as a result, but rather depends on the flow rate and on the stray magnetic field and the resulting chain formation in the MRF.

As the flow rate increases further, the passage region expands further, until it has completely taken over the transition region. Yet higher speeds cause the penetration of the blocking region. The MRF then flows in the entire flow channel. However, owing to the transition region, the penetration takes place as a flowing transition. Depending on the transition region, the pressure/speed characteristic curve of a valve device of this type can exhibit a gentle transition to the penetration region. The process is fully reversible. As the flow rate falls, the flow of MRF in the blocking region comes to a stop again and the transition region can build itself up again.

The valve characteristic curves which can be achieved by these ranges correspond to those of valves according to the prior art which are equipped with bypass bores or spring plates. In addition, particular characteristic curves can be generated, for example in order to increase the wearing comfort when used as a damper in a prosthesis, for which complicated constructions, such as packets containing a plurality of different spring plates for example, are required for the design according to the prior art.

This advantageous effect can be provided on account of it being possible for the field to be of inhomogeneous design transversely in relation to the direction of flow or even perpendicularly in relation to the direction of flow of the magnetorheological fluid.

The invention makes use of the property that a dynamic magnetic field propagates differently locally owing to different measures. This can be supported by different material properties which are used in the magnetic circuit device being specifically utilized. It is possible, for example, for a rod-type coil in which a homogeneous magnetic field flows through the core, for example an iron core, to be used. A rapid change in current induces eddy currents in the core, said eddy currents being pronounced to different extents locally. In the case of a solid core, the magnetic field is formed more in the outer region of the core or in the edge layers and migrates continuously inward over time until it is finally distributed uniformly over the cross section.

If the core of the coil is composed of a hard-magnetic material, at least a portion of the magnetic field which was generated last by the coil is permanently maintained as magnetization until new magnetization reversal. Consequently, the current intensity and the generated magnetic field determine the strength of the magnetization of the hard-magnetic material. In addition, the duration of the pulse determines the local propagation of the magnetization since the magnetic field, as described above, first has to be preliminarily passed into the core from the outside.

In addition, different materials which differ in respect of their magnetic or electrical properties can be used in the magnetic circuit device in all refinements. Therefore, materials with different magnetization characteristic curves, permeabilities, coercive field strengths or saturation magnetizations can be combined in order to make the magnetic field locally different. The different electrical conductivity can be and is primarily used in order to in this way generate eddy currents in the event of changes in the magnetic field, said eddy currents having different intensities and counteracting the propagation of the magnetic fields. Even if the same material is used for the hard-magnetic magnet components, the local propagation of the dynamic magnetic field can be influenced by means of the shape of the hard-magnetic magnet component or the shape of the magnetic circuit device.

It is also possible to assign different electrical and/or magnetic properties to the same material by different processing or treatment, such as annealing in particular.

In the case of layered materials, it is possible for the individual layers of the ferromagnetic materials to have different sheet thicknesses. Therefore, metal sheets of different thicknesses can be laminated to form a packet. It is also possible for relatively thin metal sheets to be used in one section and for relatively thick metal sheets to be used in another section.

It is also possible to combine different measures in order to generate the desired inhomogeneity. For example, layer materials can be combined with short-circuit rings or conductor loops. In this case, several conductor loops can overlap in regions.

An important difference between conductor loops or short-circuit rings of this kind compared to the electrical coil used is that these conductor loops are preferably only passively driven. This means that this conductor loop does not have to have a connection for driving purposes and can be designed in a comparatively simple manner, for example as a short-circuit ring. Active driving is not necessary in order to generate the effect according to the invention. However, it is possible to electrically connect individual conductor loops to one another and to introduce further electrical components, such as diodes or capacitors or the like for example, in order to also passively influence the temporal and local effect of the conductor loops. In this way, it is also possible for the field which is induced within a conductor loop to be used to strengthen, weaken or deform the magnetic field in another section or part.

It is also possible, for the purpose of intensifying the inhomogeneity, to provide an air gap in a partial section in order to locally change the inductance. It goes without saying that any other material with a comparatively low permeability can be used instead of air. In this case, the dynamic effect can be considerably intensified with a non-ferromagnetic material which, however, has a high conductance. By way of example, aluminum or copper can be used, as a result of which this effect can be combined with that of the conductor loop.

Overall, the local field differences which can be achieved by dynamic field changes are stored as remaining magnetization in a hard-magnetic material. Therefore, hard-magnetic materials are preferably provided at the locations in the magnetic circuit device at which inhomogeneities are produced by the different measures. The hard-magnetic magnet components are particularly preferably provided in the region of the flow channel or even in a manner bearing against the flow channel.

Further advantages and features of the present invention can be found in the description of the exemplary embodiments which will be explained below with reference to the appended figures, in which.

BRIEF DESCRIPTION OF THE SEVERAL VIEWS OF THE DRAWING

DESCRIPTION OF THE INVENTION

Figure 1:
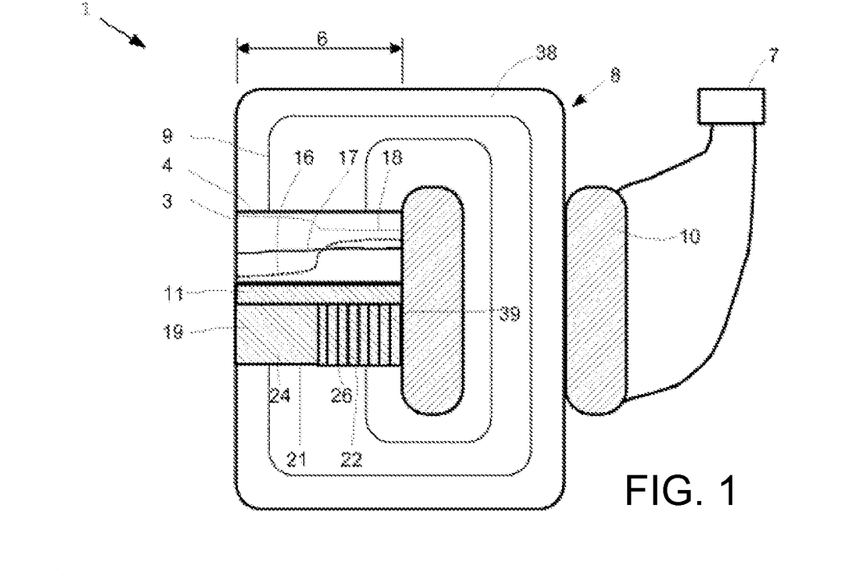
FIG. 1 shows a highly schematic side view of a valve device according to the invention.

The valve device 1 according to the invention which is schematically illustrated in cross section in FIG. 1 has a magnetic circuit device 8 which comprises an electrical coil 10, a control device 7 and a core 38. The core 38 preferably has a layer structure parallel to the plane of the page. As illustrated highly schematically in FIG. 1, the core can also be designed in a manner layered perpendicularly in relation to the plane of the drawing. In this case, the magnetic circuit device 8 has a hard-magnetic magnet component 11 which is composed at least partially, and in this case completely, of a hard-magnetic material.

Two sections 21 and 22 are provided, said sections being in the form of separate components 23 and 25 in this case.

Both sections 21 and 22 are ferromagnetic. The first section 21 comprises a solid body 24. The second section 22 in this case comprises a layer material 26 in which individual ferromagnetic layers and electrically non-conductive intermediate layers 39 of conventional layer thickness are laminated one on the other. The non-conductive intermediate layers can be composed of electrically insulating material, but can also be designed as an insulating coating or oxide layer or similar material surface. The layer material 26 is preferably laminated in such a way that the individual layers run parallel to the magnetic field lines. The layers preferably run in the manner illustrated in the drawing or parallel to the plane of the drawing.

The ferromagnetic sections 21 and 22 on the magnetic circuit device 8 differ in terms of their dynamic magnetic properties. As a result, an inhomogeneous magnetic field is formed in the case of dynamic effects, such as given magnetic pulses for example. This is because the section 22 is electrically anisotropic while the section 21 is homogeneous. As a result, eddy currents are considerably reduced in the section 22, while considerable eddy currents are formed in the section 21, these eddy currents delaying the build-up of the magnetic field in the section 21.

If, for example owing to an electrical pulse of the electrical coil 10, a magnetic pulse is applied to the magnetic circuit device 8 and therefore also the ferromagnetic sections 21 and 22, eddy currents can propagate considerably more poorly in the section 22 than in the section 21. As a result, the section 22 opposes the applied changes in the magnetic field considerably less than the section 21. The laminated section 22 will follow the pulse which is generated by the coil 10 more quickly and therefore with a greater edge gradient than the solid section 21. Therefore, higher field strengths can be achieved in a shorter time in the section 22 than in the section 21. This means that a short magnetic pulse which is applied by the electrical coil 10 leads to different magnetic field strengths and field profiles in the sections 21 and 22. However, the magnetic pulse or its achieved field strengths are stored in the hard-magnetic magnet component 11 which borders the sections 21 and 22. As a result, the shape of the magnetic field which is formed in an inhomogeneous manner along the sections 21 and 22 is permanently stored.

In this case, the hard-magnetic magnet component 11 bears directly against a flow channel 3 which has a flow cross section 4. The flow channel 3 is filled with a magnetorheological medium or fluid 2 (cf. FIG. 6). The ferromagnetic particles of the magnetorheological fluid link up along the magnetic field 9 and form chain-like structures along the field lines. The intensity of the linking depends on the strength of the magnetic field.

Analogously, the entire magnetic circuit 8 or else other parts of the magnetic circuit 8 as illustrated in FIG. 1 can also be composed of hard-magnetic material 11. Similarly, the entire magnetic circuit 8 or else parts thereof, such as the regions on both sides of the flow channel 3 for example, can also be in the form of sections 21 and 22 with different dynamic magnetic properties. In addition, it is possible for these sections 21 and 22, in addition to the different dynamic magnetic properties, to also be hard-magnetic.

FIG. 1 schematically shows three magnetic field profiles 16, 17 and 18 over the channel width 6 of the flow channel 3, that is to say transversely to the direction 5 of flow of the medium 2 which, in this case, runs normal to the plane of the drawing. The magnetic field profiles 16, 17 and 18 have been generated by the magnetic pulses 13, 14 and 15 illustrated in FIG. 2. To this end, corresponding electrical pulses are applied to the electrical coil 10 by the control device 7.

Figures 2, 3:
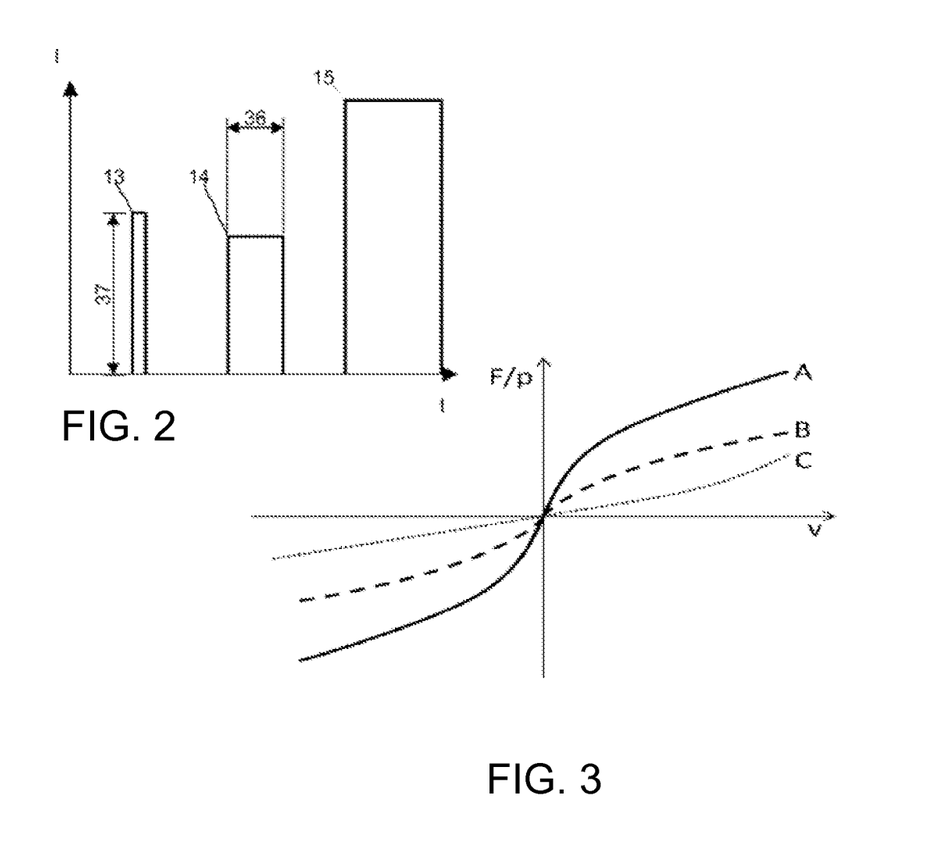
FIG. 2 shows three different pulses for generating different inhomogeneous magnetic field profiles.
FIG. 3 shows a schematic illustration of three different characteristic curves of the valve device from FIG. 1.

The magnetic pulse 13 has a relatively high intensity 37 and a very short length 36. Since the sections 21 and 22 differ in terms of their dynamic magnetic properties, the magnetic field profile 16 illustrated schematically in FIG. 1 can be generated over the channel width 6 by the magnetic pulse 13. Proceeding from the demagnetized starting state, only a relatively low magnetic field strength is achieved in the section 21, while a considerably higher magnetic field strength is achieved in the section 22. The profile of the magnetic field strength in the sections 21 and 22 is stored as permanent magnetization in the hard-magnetic hard magnet component 11. A transition region 28 will form, in particular, in the hard-magnetic component 11 and in the flow channel 3 owing to stray magnetic fields. There may be a sliding transition region 28 in the sections 21 and 22. However, it is also possible to provide a sliding region for transition over three or more different sections 21, 22 etc., said sliding region being stored in the hard-magnetic hard magnet component 11.

The magnetic pulse 14 illustrated in FIG. 2, which has a considerably greater duration than pulse 13, generates a magnetic field profile 17 which is virtually homogeneous over the channel width 6 or the width of the sections 21 and 22. This is because, here, the duration of the magnetic pulse 14 is so great that the differently dynamic properties of the sections 21 and 22 no longer play a role or no longer play a significant role. The stored magnetic field strength in the hard-magnetic magnet component 11 is then correlated with the level of intensity of the magnetic pulse 14 and in this case is somewhat lower than the maximum field strength of the magnetic field profile 16.

When a homogeneous magnetic field is achieved on account of the duration and intensity of a pulse, as illustrated by pulse 14 or the field profile 17, different dynamic magnetic properties of the various sections 21 and 22 do not play a role or play only a small role. In this case, even relatively long pulses 14 do not cause any (significant) change in the field profile 17. The permanently remaining magnetization can also be established by means of the intensity 37 of the pulses 14, that is to say the current intensity in the electrical coil 10.

When further different hard-magnetic materials are locally used for the sections 21 and 22 or for the hard-magnetic magnet component 11, the magnetic field profile 18, for example, can be generated by a magnetic pulse 15.

The magnetic pulse 15 has a considerably higher intensity than the magnetic pulses 13 and 14. Furthermore, the magnetic pulse 15 has a length 36 such that dynamic effects play only a secondary role in the magnetic circuit device 8. By combining these features, a higher field strength is stored in the region of the section 21 in the hard-magnetic magnet component 11 than in the region of the section 22 of the magnetic magnet component 11. This may be because, here, the hard-magnetic magnet component 11 has different electromagnetic properties, such as a lower magnetic saturation for example, in the section 22 than in the section 21.

It is clear from this example that different magnetic field profiles can be generated over the channel width of the channel 3 by different magnetic pulses, and stored. In this case, the field strength of the stored magnetic field 9 can be varied by means of the intensity 37, and the inhomogeneity of the magnetic field profile can be influenced by means of the length 36 of the magnetic pulse.

This exemplary embodiment clearly shows how a very simple valve structure 1, in which only at least one part of the magnetic circuit 8 has to be hard-magnetic and two sections 21, 22 have different dynamic magnetic properties, can specifically generate extremely different valve characteristic curves with only one electrical coil 10 and therefore also only one simple drive means 7.

FIG. 3 shows three different characteristic curves A, B and C of a valve device 1. In this case, FIG. 3 shows a graph of the force or the pressure with respect to the flow rate or relative speed or the compression or extension speed of a damper 100. The valve device 1 can generate all three illustrated characteristic curves A, B and C and also any desired intermediate positions. Similarly to a mechanical damper, the characteristic curve which is respectively currently set is also permanently maintained without energy being supplied. No complicated closed-loop control is required. The use of sensors can also be dispensed with. Similarly to a damper which can be controlled in real time or a valve device which can be controlled in real time, the valve device 1 according to the invention can be switched over to another characteristic curve very quickly in a damper. The changeover process can be carried out in less than 5 seconds, preferably in less than 1 second, preferably in less than 100 milliseconds, and particularly preferably in a few milliseconds or faster.

In order to change the characteristic curve, only the current of the electrical coil 10 has to be subjected to closed-loop control or open-loop control precisely with respect to time, it being possible for this to be implemented in a very simple and cost-effective manner using commercially available control devices. The required time resolutions, for example in the microsecond range, can be realized without particular expense.

When changing from one characteristic curve to another characteristic curve, it may be necessary for the magnetic field of the electrical coil 10 to briefly be stronger or weaker than the permanently acting field 9 of the magnetic circuit device 8 at least in parts of the flow channel 3. Owing to the brief superimposition of the magnetic fields, the resulting field and therefore the characteristic curve which is generated by the valve device 1 can differ considerably from the desired curve which is to be programmed in. In customary applications, the adjustment during these short pulses will not play any role or will be compensated for by the mass inertia and/or further dampers and/or further spring-action elements and/or, for example, by the ability to compress the magnetorheological fluid 2. If desired, the characteristic curve could also be changed over in situations of the kind in which said effects do not play any role. In the case of the characteristic curves illustrated in FIG. 3, a suitable time point at which a user may not notice the change pulse is at the speed 0. However, other speeds and/or other parameters may be advantageous, depending on the design and the desired properties and the selected characteristic curves.

Before a characteristic curve is reprogrammed, it is possible, for example, for an alternating magnetic field, which weakens over time, to be used in order to initially demagnetize the hard-magnetic material and to delete the characteristic curve previously stored. The desired characteristic curve can then be set by a suitable magnetic pulse. It is also possible to move from one characteristic curve to another characteristic curve by means of a corresponding pulse, without having to first delete the previously stored characteristic curve.

Figure 4:
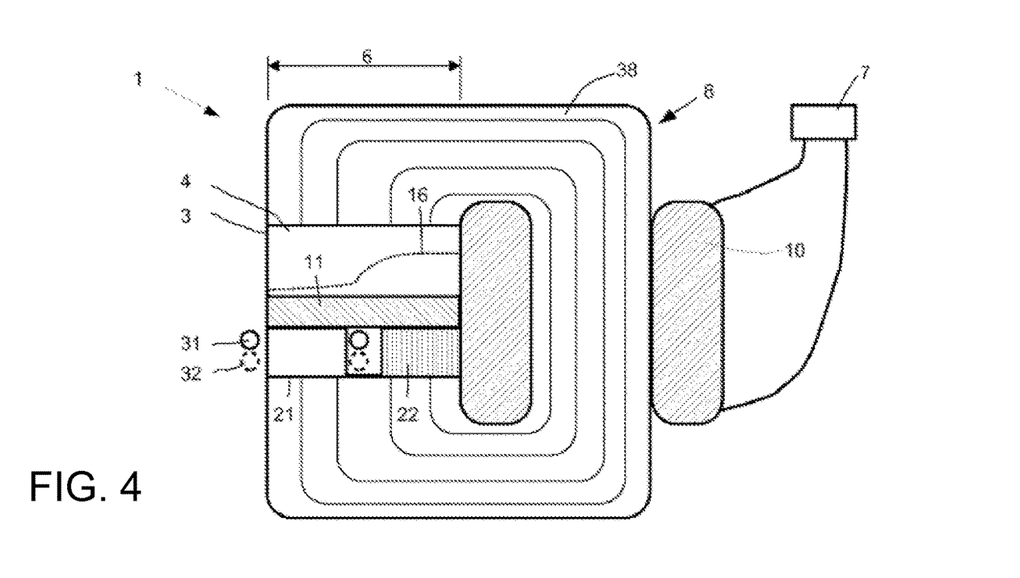
FIG. 4 shows a further schematic illustration of a valve device according to the invention.

FIG. 4 shows a further schematic view of a valve device 1 according to the invention, in which the magnetic field 9 prevailing in the flow channel 3 can be permanently changed by means of electrical pulses of the electrical coil 10, in a manner controlled by the control device 7.

For the purpose of better understanding, two separate ferromagnetic sections 21 and 22 are again shown here. The section 21 is surrounded by a conductor loop 31 which is designed, in particular, as a short-circuit coil. To this end, the conductor loop 31 is designed, in particular, as a ring with at least one turn 34. However, it is also possible for the conductor loop 31 to have a plurality of turns around the section 21. A second conductor loop 32 which locally more strongly changes the dynamic magnetic behavior of the section 21 and therefore the magnetic behavior of the hard-magnetic magnet component 11 is also possible and shown using dashed lines in FIG. 4. The two conductor loops 31 and 32 can be electrically connected to one another, have different numbers of turns or conductances and also enclose different sections of the magnetic circuit device 8.

The two sections 21 and 22 can be composed of the same ferromagnetic material, but can also be produced from different materials. It is possible for only one single hard-magnetic magnet component 11 to be provided. Two or more hard-magnetic magnet component 11 can also be provided.

It is possible for a ferromagnetic section 21 to be surrounded by the conductor loop 31, whereas a ferromagnetic section 22 is not surrounded by a conductor loop 31.

The dynamic magnetic properties of the ferromagnetic section 21 and the ferromagnetic component 23 of the magnetic circuit device 8 are influenced and locally stored in the hard-magnetic magnet component 11 by the conductor loop 31. When a magnetic pulse acts on the sections 21 and 22, a current will be induced in the conductor loop 31, said current in turn generating a magnetic field which opposes the field change. As a result, the field change can propagate more slowly in the auxiliary pole which is surrounded by the conductor loop or in the section 21 than in the other section 22 or in the component 25. In the case of short magnetic pulses 13, a corresponding inhomogeneity of the magnetic field is therefore achieved and stored, said inhomogeneity being reflected in the magnetic field profile 16 which is shown in FIG. 4.

In FIG. 4, the section 21 can be solid and the section 22 can be composed of layer material. Both sections 21 and 22 can also be composed of layer material 26.

Figure 5:
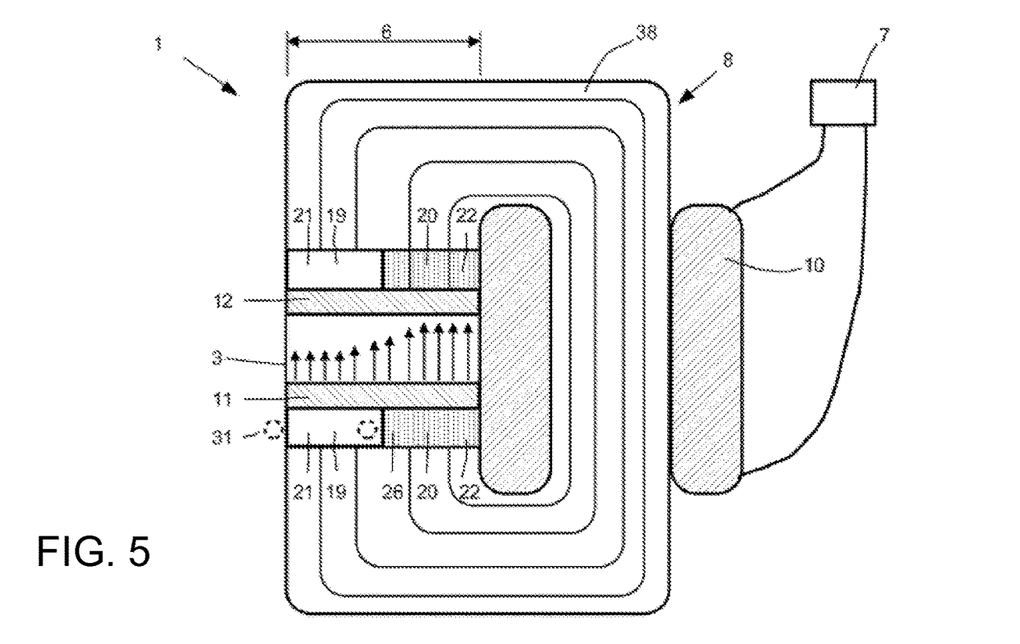
FIG. 5 shows yet another schematically illustrated valve device according to the invention.

FIG. 5 shows a schematically illustrated valve device 1 in which, by way of example, different measures are illustrated in order to be able to set the desired inhomogeneous properties.

The valve device 1 has respective hard-magnetic components 11 and 12 on each side of the flow channel 3. In each case one ferromagnetic section 21 and at least one ferromagnetic section 22 are associated with each hard-magnetic component 11 and 12. In this case, the hard-magnetic components 11 and 12 directly adjoin the flow channel 3. It is also possible for the sections 21 and 22 to adjoin the flow channel 3, and for the hard-magnetic components 11 and 12 to again indirectly or directly adjoin the sections 21 and 22, or for the sections 21 and 22 themselves to have hard-magnetic properties.

In this case, the ferromagnetic section 21 is composed of a material 19 and has a solid body 24. The section 22 is composed of layer material 26 composed of an, in particular, ferromagnetic material 20. As a result, relatively large eddy currents, which slow down the propagation of a field in the section 21, are produced in the section 21 in the event of changes in the magnetic field.

In order to further support this behavior, conductor loops 31 (and 32) can be provided on the section 21 in the exemplary embodiment according to FIG. 5, said conductor loops locally reducing the dynamics there. The conductor loop 31 can comprise one turn 34 or else a plurality of turns 34.

An extremely wide variety of partial regions or virtually the entire magnetic circuit device can be designed in laminated form from hard-magnetic material. In addition, a plurality of sections 21, 22 etc. of the magnetic circuit device can be produced from different material, wherein the material differs mainly by virtue of its electrical and magnetic properties, in order to influence the dynamics.

Figure 6:
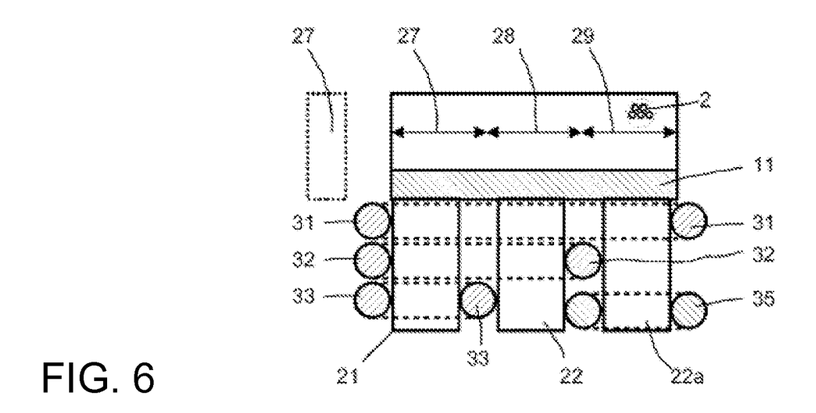
FIG. 6 shows an enlarged detail of another valve device according to the invention.

A relatively large dynamics range can be generated by combining different effects in this case. The strength of the magnetic field 9 is indicated by arrows of different lengths in the flow channel 3 in this case. Said figure clearly shows a transition region 28 with different arrow lengths, a blocking region 29 with long arrows, and a passage region 27 with only little magnetization and accordingly short arrows. If required, the region 27 can exhibit a magnetization with even lower field strength FIG. 6 schematically shows a detail of a further variant of a valve device 1, wherein three sections 21, 22 etc. or three poles are provided in a manner adjoining a flow channel 3 in this case. Three conductor loops 31, 32 and 33 are provided for influencing the dynamics. The short-circuited conductor loop 31 surrounds all three ferromagnetic sections or poles 21, 22 and 22a. The conductor loop 32 surrounds only two ferromagnetic sections or poles 21, 22, and the short-circuited conductor loop 33 surrounds only one pole 21. As a result, the short-circuited conductor loops 31, 32 and 33 act on one section 21, depicted on the left-hand side here, while only the conductor loops 31 and 32 act on a second, here the central, pole or section 22, and only a single conductor loop 31 acts on the third pole 22a, here the furthest on the right. The inhomogeneously generated magnetic field will be stored in the hard-magnetic magnet component 11.

An additional bypass 27 can be provided next to the flow channel and is illustrated using dashed lines in FIG. 6. The bypass 27 can also be connected to the flow channel 3.

In addition to the hard-magnetic magnet material for storing the magnetization and the dynamically magnetic material for generating inhomogeneous fields, further regions and structures are possibly present in the magnetic circuit device, said regions and structures primarily serving to close the magnetic circuit. This is intended to have as small an influence as possible on magnetic field changes and to permit very steep time field gradients relative to the dynamic magnetic sections. This ensures that the dynamic effect is maximized in the regions provided for that purpose and therefore that locally strongly inhomogeneous fields can be generated. This can be ensured, for example, by a laminated design comprising layer material.

Overall, the invention provides a cost-effective valve device 1 and a damper 100 which is equipped with said valve device. An inhomogeneous magnetic field can be selectively imposed in this case.

In FIG. 1, the left-hand region at the section 21 without a magnetic field or with a small magnetic field is, for example, provided as the passage region 27. This passage region 27 offers the least resistance to the flowing medium and can be compared with a bore in a conventional valve. The blocking region 29, in which a strong and relatively uniform magnetic field prevails, is provided on the far right-hand side at the section 22. The transition region 28 is provided between said passage region and blocking region. The magnetic field profile 16 can correspond, for example, to the characteristic curve A in FIG. 3.

By way of example, the characteristic curve "B" from FIG. 3 can be set by increasing the size of the passage region 27 and of the transition region 28 at the expense of the blocking region 29.

In the valve device 1 illustrated in FIG. 4, the majority of the flow channel 3 is surrounded by a C-shaped core 38. The electrical coil 10 is provided on the right-hand side. If, when a conductor loop or a short-circuit coil or a short-circuit ring 31 is used, a current pulse is output to the electrical coil 10, the electrical coil 10 generates a magnetic pulse in the magnetic circuit device 8. The field change induces a current in the short-circuit ring, said current creating a magnetic field which opposes the field change at the section 21. This dynamic effect decreases with the duration of the magnetic pulse, so that an equilibrium state is established after a certain time. In the static state, that is to say in the case of very long current pulses, the magnetic field will be distributed homogeneously over the entire width of the hard-magnetic components 11 and 12 and therefore the main and secondary poles. In this case, generation of a magnetic pulse by an electrical coil 10 is sufficient to generate an inhomogeneous profile of the magnetic field over the width of the flow channel. The intensity of and differences in the magnetization can be changed in a large range by controlling the current height and the pulse duration.

In a simple embodiment, a microcontroller with a switching element, such as a transistor or a MOSFET, which is driven by means of a PWM signal (pulse width modulation) is sufficient for this purpose. A switch which is controlled precisely in respect of time, wherein driving can be taken over by a timer or else controller, is sufficient as an extremely simple embodiment.

A full bridge is preferably used as the switching element. At least some of the energy for a current pulse is particularly preferably provided by a capacitor. It is possible to change the inhomogeneity of the field with the same switching time by means of the charging or charging voltage of the capacitor.

The control system can be extended in order to be able to generate, for example, more complex curve shapes. Depending on the design of the valve device 1 and the desired characteristic curve, it is possible, for example, to generate a ramp-like current profile or a very strong current pulse at the start, followed by a low magnetization current. It is also possible to output a plurality of pulses which have different profiles and intensities in succession.

Different laminations in regions or the entire magnetic circuit device and the use of different materials are also possible. It is possible to use, for example, soft-magnetic compounds (SMC) and/or FePBNbCr and/or other pulverulent composite materials.

Figure 7:
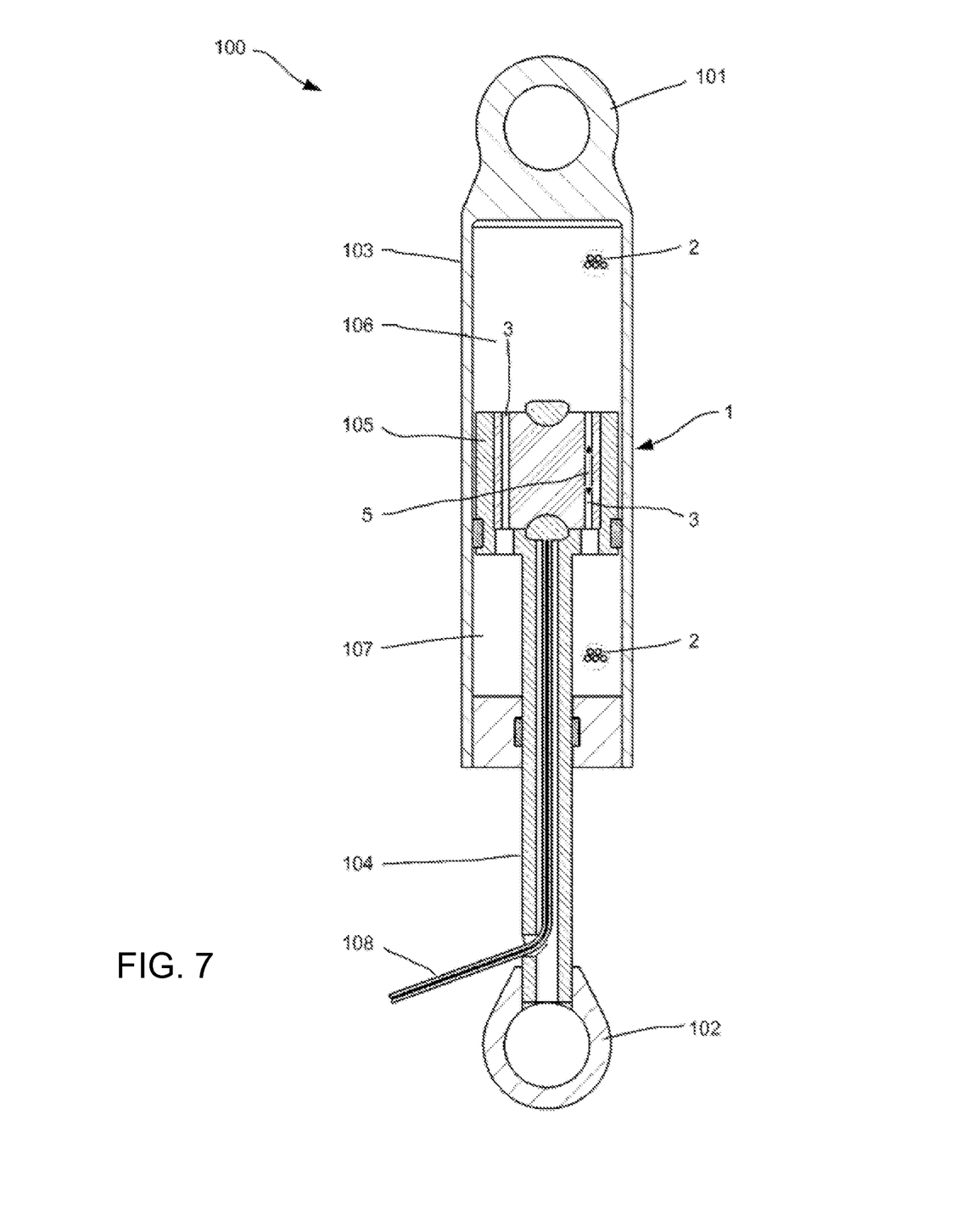
FIG. 7 shows a damper according to the invention with a valve device.

FIG. 7 shows a damper 100 according to the invention which is equipped with at least one valve device 1, as has been described above. In this case, the damper 100 has a first end 101 and a second end 102, it being possible for said ends to be connected to to two different housing parts, housings or bodies in order to damp a relative movement of the bodies relative to one another.

The damper 100 has a damper housing 103 in which a piston 105 is arranged. The piston 105 is connected to a piston rod 104 which is fixedly connected to the second end 102 in this case.

The piston 105 divides the interior of the damper housing 103 into a first damper chamber 106 and a second damper chamber 107 which are at least partially filled with a magnetorheological medium and, in particular, a magnetorheological fluid 2.

In this case, the piston 105 also serves as a valve device 1 or comprises at least one valve device. To this end, at least one flow channel 3 is provided in the piston 105. The flow of the magnetorheological fluid 2 is damped as it passes through the flow channel 3 of the piston 105. The direction 5 of flow is directed either from the first damper chamber to the second damper chamber or vice versa.

The magnetorheological fluid 2 is accordingly damped depending on the setting of the magnetic circuit 8 of the valve device 1. Depending on the setting, the damper 100 or the valve device 1 therein provide a bypass or passage region 27, a transition region 28 and a blocking region 29, wherein the respective portion can be controlled by the control device 10. As a result, a damper 100 can be provided with variable characteristic curves A, B or C etc. in a simple and cost-effective manner.

Figure 8:
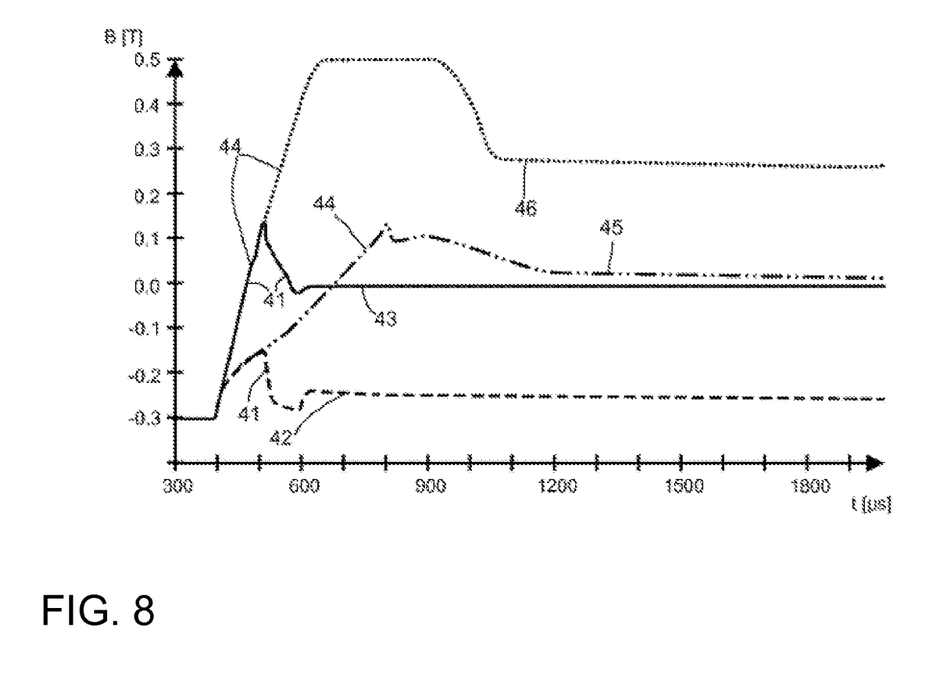
FIG. 8 shows a plurality of field strength profiles for different electrical pulses.

FIG. 8 shows measurement results of a test set-up in which the polarity of two identical poles or sections 21, 22, which are composed of the hard-magnetic material AlNiCo, next to one another in the same magnetic circuit 8 were remagnetized by current pulses of different lengths. In order to achieve different dynamic magnetic properties, a conductor loop 31 in the form of a short-circuit turn was placed around a section 21.

The magnetic flux in the flow channel 3 was directly measured over the sections 21 and 22 by a Gaussmeter and plotted with respect to time. As the starting value, the two sections 21 and 22 were negatively magnetized to the maximum before each current pulse, wherein the field strength was −0.3 tesla in this case.

A current pulse 41 with a duration of 100 microseconds is sufficient to demagnetize the section 22. The flux density 43 approximates 0 tesla, wherein the flux density 42 in the section 21 is reduced by only 50 millitesla to approximately −0.25 tesla.

Proceeding from a homogeneous magnetization in the flow channel 3, a virtually field-free region, which corresponds to a bypass of a damper according to the prior art, was therefore created by a current pulse 41 with a duration of only 100 μs in the flow channel 3 over the section 22, whereas the section 21 still remains almost completely magnetized in the case of the pulse 41.

However, once again proceeding from the maximum negative magnetization of the two sections 21 and 22, section 22 can also be positively magnetized to the maximum by a current pulse 44 which lasts for 400 μs. The flux density 46 remains approximately equally high, but the polarization has been reversed. However, the same current pulse 44 is also sufficient for approximately demagnetizing section 21, so that the flux density 45 is approximately 0 tesla.

These two examples show that it is possible to magnetize the two sections 21 and 22 independently of one another to any desired values and also to reverse the polarity. Depending on the magnetization, several pulses may be required for this purpose under certain circumstances, for example in order to first move the section 21, which forms a "slow pole" here, to the desired magnetization and then to adjust said section 21 following the magnetization of the section 22, which forms a "fast pole" here.

FIG. 8 shows only the time profile of the respective field strengths directly over the sections 21 and 22. A corresponding magnetic field is established in the flow channel 3 transversely to the direction 5 of flow in accordance with the design of the sections 21 and 22 and depending on the pulse.

LIST OF REFERENCE SYMBOLS;

1 Valve device
2 Magnetorheological fluid/medium
3 Flow channel
4 Flow cross section
5 Direction of flow
6 Channel width
7 Control device
8 Magnetic circuit device
9 Magnetic field
10 Electrical coil
11 Hard-magnetic magnet component
12 Hard-magnetic magnet component
13 Magnetic pulse
14 Magnetic pulse
15 Magnetic pulse
16 Magnetic field profile
17 Magnetic field profile
18 Magnetic field profile
19 Ferromagnetic material
20 Ferromagnetic material
21 Section
22 Section
23 Component
24 Solid body
25 Component
26 Layer material
27 Passage region, bypass
28 Transition region
29 Blocking region
31 Conductor loop
32 Conductor loop
33 Conductor loop
34 Turn
35 Electrical coil
36 Length (of 13-15)
37 Intensity (of 13-15)
38 Core
39 Layer
41 Pulse (100 μs)
42 Flux density in section 21
43 Flux density in section 22
44 Pulse (400 μs)
45 Flux density in section 21
46 Flux density in section 22
100 Damper
101 End
102 End
103 Housing
104 Piston rod
105 Piston
106 First damper chamber
107 Second damper chamber
108 Cable

The invention claimed is:

1. A valve device, comprising:
at least one flow channel through which a magnetorheological medium flows;
a magnetic circuit device for generating a magnetic field in the flow channel, said magnetic circuit device including at least one hard-magnetic magnet component and at least one electrical coil;
a control device connected to and configured for driving said electrical coil;
said magnetic circuit device having at least two sections with mutually different dynamic magnetic properties, enabling a specific inhomogeneity of the magnetic field to be set in said flow channel by way of a magnetic pulse to be output by said electrical coil and to be permanently stored in said at least one hard-magnetic magnet component, and at least one short-circuited conductor loop associated with at least one of said sections; and
wherein said at least two sections adjoin said at least one hard-magnetic magnet component, and said at least one hard-magnetic magnet component at least in part delimits a height of said at least one flow channel.

2. The valve device according to claim 1, wherein said at least one conductor loop has at least one turn.

3. The valve device according to claim 1, wherein at least two conductor loops are electrically connected to one another.

4. The valve device according to claim 1, wherein said sections are formed of materials with mutually different electrical or magnetic properties.

5. The valve device according to claim 4, wherein at least one part of a section comprises a solid ferromagnetic body and/or wherein at least one part of a section is composed of a layer material.

6. The valve device according to claim 1, wherein the dynamic magnetic properties of a respective section are defined by a shape of said section.

7. The valve device according to claim 1, wherein said sections are at least partially separate ferromagnetic components.

8. The valve device according to claim 1, wherein said at least two sections are composed of a same material, and wherein different magnetic or electrical properties are achieved by different shaping, processing and/or treatment of the material.

9. The valve device according to claim 1, wherein said at least one hard-magnetic magnet component is arranged adjacent said flow channel, or said at least one hard-magnetic magnet component adjoins said flow channel.

10. The valve device according to claim 1, wherein said sections or a further part of said magnetic circuit device or an entire said magnetic circuit device has hard-magnetic properties.

11. The valve device according to claim 1, wherein said sections include a section which reacts more slowly to the magnetic field and a section which reacts more quickly to the magnetic field.

12. The valve device according to claim 1, wherein said control device is configured for outputting pulses of mutually different length and/or intensity.

13. The valve device according to claim 12, wherein said pulses required for different magnetization of said sections are shorter than 1 second.

14. The valve device according to claim 1, wherein the inhomogeneity of the magnetic field to be set in said flow channel extends transversely to a direction of flow.

15. The valve device according to claim 14, wherein said sections are offset relative to one another in a direction of a channel width transversely to the direction of flow.

16. The method according to claim 1, which comprises adjusting the magnetization of hard-magnetic material specifically with local differences in terms of shape and intensity depending on a pulse height, a pulse duration and a pulse shape of at least one magnetic pulse.

17. The method according to claim 1, which comprises permanently changing a valve or damper characteristic curve by at least one magnetic pulse of an electrical coil.

18. The method according to claim 1, wherein said at least two sections are offset from one another in a transverse direction relative to said at least one flow channel.

19. A damper, comprising:
two bodies to be moved relative to one another and having at least two damper chambers;
at least one valve device disposed between said damper chambers, said valve device having at least one flow channel through which a magnetorheological medium flows;
a control device;
at least one magnetic circuit device for generating at least one magnetic field in said flow channel, said magnetic circuit device including at least one hard-magnetic magnet component and at least one electrical coil to be driven by said control device;
said at least one magnetic circuit device having at least two sections with mutually different dynamic magnetic properties, enabling a specific inhomogeneity of the magnetic field to be set in said flow channel by way of a magnetic pulse to be output by said electrical coil and to be permanently stored in said at least one hard-magnetic magnet component, and at least one short-circuited conductor loop associated with at least one of said sections; and
wherein said at least two sections adjoin said at least one hard-magnetic magnet component, and said at least one hard-magnetic magnet component at least in part delimits a height of said at least one flow channel.

20. A method for operating a valve device, the valve device having at least one flow channel through which a magnetorheological medium flows, the method comprising:
providing a control device for control purposes;
providing a magnetic circuit device having at least one hard-magnetic magnet component and at least one electrical coil to be driven by the control device, wherein the magnetic circuit device has at least two sections which differ in terms of their dynamic magnetic properties and which adjoin the at least one hard-magnetic magnet component, and at least one short-circuited conductor loop associated with at least one of the sections;
outputting at least one magnetic pulse by the electrical coil, and permanently storing an inhomogeneity of the magnetic field, which inhomogeneity is generated by the magnetic pulse, in the hard-magnetic magnet component.

21. The method according to claim 20, which comprises varying a generation of the inhomogeneity by generating a more inhomogeneous magnetic field in the flow channel by a short pulse than by a long pulse.

22. The method according to claim 20, which comprises generating a homogeneous magnetic field in the flow channel by a long magnetic pulse or a static magnetic field.

23. The method according to claim 20, which comprises, in order to model a characteristic curve, generating a dynamic magnetic field by the electrical coil and superimposing the dynamic magnetic field on the static magnetic field of the hard-magnetic material of the magnetic circuit device, without changing a permanent magnetization of said static magnetic field.

24. The method according to claim 20, which comprises influencing the magnetic field of the hard-magnetic component by way of the associated electrical coil and continuously varying and/or permanently changing the magnetic field by way of short pulses of the electrical coil.

25. The method according to claim 20, which comprises dynamically influencing the magnetic field of the electrical coil by a magnetic field of a conductor loop at least in sections during a magnetic pulse.

* * * * *